United States Patent
Zhang et al.

(10) Patent No.: US 11,640,380 B2
(45) Date of Patent: May 2, 2023

(54) TECHNIQUE OF COMPREHENSIVELY SUPPORTING MULTI-VALUE, MULTI-FIELD, MULTILEVEL, MULTI-POSITION FUNCTIONAL INDEX OVER STORED AGGREGATELY STORED DATA IN RDBMS

(71) Applicant: Oracle International Corporation, Redwood Shores, CA (US)

(72) Inventors: Hui Zhang, San Ramon, CA (US); Zhen Hua Liu, San Mateo, CA (US); Ying Lu, Sunnyvale, CA (US); Beda Christoph Hammerschmidt, Los Gatos, CA (US); Douglas James McMahon, Redwood City, CA (US); Denis B. Mukhin, Burlington, MA (US)

(73) Assignee: Oracle International Corporation, Redwood Shores, CA (US)

(*) Notice: Subject to any disclaimer, the term of this patent is extended or adjusted under 35 U.S.C. 154(b) by 107 days.

(21) Appl. No.: 17/198,159

(22) Filed: Mar. 10, 2021

(65) Prior Publication Data
US 2022/0292067 A1    Sep. 15, 2022

(51) Int. Cl.
G06F 16/22    (2019.01)
(52) U.S. Cl.
CPC ...... *G06F 16/2246* (2019.01); *G06F 16/2282* (2019.01)
(58) Field of Classification Search
CPC ......... G06F 16/90335; G06F 16/2228; G06F 16/2246; G06F 16/284; G06F 16/289
(Continued)

(56) References Cited

U.S. PATENT DOCUMENTS 5,615,367 A    3/1997  Bennett et al.
5,835,917 A    11/1998 Shin et al.
(Continued)

FOREIGN PATENT DOCUMENTS

CN    101661481 A    3/2010
WO   WO 03/107222 A1    12/2003
(Continued)

OTHER PUBLICATIONS

McHugh et al., "Lore: A Database Management System for Semistructured Data", SIGMOD, vol. 26 No. 3, dated Sep. 3, 1997, 14 pages.
(Continued)

*Primary Examiner* — Hung T Vy
(74) *Attorney, Agent, or Firm* — Hickman Becker Bingham Ledesma LLP; Brian N. Miller

(57) ABSTRACT

Herein is acceleration for JavaScript object notation (JSON) documents in a relational database based on multilevel, multifield, multivalued indexing and querying. In an embodiment, into a table in a relational database, a computer stores many hierarchical data objects that respectively contain multiple levels that respectively contain one or more fields. An index is generated for indexed values in fields in at least two of the multiple levels. Based on the index, a database statement that references the table in the relational database and at least one of the indexed fields is executed. Indices herein provide matching to more fields in more levels of hierarchical data objects thereby decreasing or eliminating further filtering by brute force after index access. Matching ordinal positions within an array field needs no further filtration after index access. A single index provides increased spatial locality of index entries for acceleration. Index maintenance is minimized for acceleration.

19 Claims, 10 Drawing Sheets

201 In table in relational database, store hierarchical data objects that respectively contain levels that respectively contain one or more fields 202 Generate index for indexed values in fields in at least two levels in hierarchical data objects 203 Based on index for indexed values in fields in at least two levels, execute database statement that references table in relational database and at least one field in index

(58) Field of Classification Search
USPC .......................................................... 707/741
See application file for complete search history.

(56) References Cited

U.S. PATENT DOCUMENTS

| | | | |
|---|---|---|---|
| 6,233,575 | B1 | 5/2001 | Agrawal et al. |
| 6,611,843 | B1 | 8/2003 | Jacobs |
| 6,836,778 | B2 | 12/2004 | Manikutty |
| 7,219,102 | B2 | 5/2007 | Zhou |
| 7,454,435 | B2 | 11/2008 | Friedman |
| 7,493,305 | B2 | 2/2009 | Thusoo |
| 7,877,400 | B1 | 1/2011 | Matthew |
| 8,055,683 | B2 | 11/2011 | Brodhun et al. |
| 8,612,487 | B2 | 12/2013 | Hui |
| 8,805,849 | B1 | 8/2014 | Christensen et al. |
| 10,552,443 | B1 * | 2/2020 | Wu ..................... G06F 16/2255 |
| 11,144,513 | B1 | 10/2021 | Padisetty et al. |
| 2003/0061189 | A1 | 3/2003 | Baskins |
| 2004/0103105 | A1 | 5/2004 | Lindblad |
| 2005/0050059 | A1 | 3/2005 | Van Der Linden |
| 2005/0055334 | A1 | 3/2005 | Krishnamurthy |
| 2005/0055355 | A1 | 3/2005 | Murthy |
| 2005/0198019 | A1 | 9/2005 | Cunnungham |
| 2005/0228828 | A1 | 10/2005 | Chandrasekar et al. |
| 2005/0268171 | A1 | 12/2005 | House et al. |
| 2006/0031233 | A1 | 2/2006 | Liu |
| 2006/0047719 | A1 | 3/2006 | Hershkovich |
| 2006/0117307 | A1 | 6/2006 | Averbuch |
| 2007/0073643 | A1 | 3/2007 | Ghosh |
| 2007/0239681 | A1 | 10/2007 | Krishnaprasad |
| 2007/0271218 | A1 | 11/2007 | Lim et al. |
| 2008/0010256 | A1 | 1/2008 | Lindblad |
| 2008/0183657 | A1 | 7/2008 | Chang |
| 2008/0189303 | A1 | 8/2008 | Bush et al. |
| 2008/0235252 | A1 | 9/2008 | Sakai et al. |
| 2009/0182762 | A1 | 7/2009 | Chang et al. |
| 2009/0307241 | A1 | 12/2009 | Schimunek et al. |
| 2010/0161569 | A1 | 6/2010 | Schreter |
| 2010/0262631 | A1 * | 10/2010 | Andersson ............ G06F 16/289 707/E17.108 |
| 2011/0093429 | A1 | 4/2011 | Ge et al. |
| 2011/0113036 | A1 | 5/2011 | Idicula et al. |
| 2011/0179085 | A1 | 7/2011 | Hammerschmidt |
| 2011/0208774 | A1 | 8/2011 | Breining |
| 2011/0289118 | A1 | 11/2011 | Chen |
| 2012/0036133 | A1 | 2/2012 | Chen et al. |
| 2012/0221604 | A1 | 8/2012 | Gao |
| 2013/0086127 | A1 | 4/2013 | Pogmore |
| 2014/0095519 | A1 | 4/2014 | Liu |
| 2015/0134670 | A1 * | 5/2015 | Liu ..................... G06F 16/2246 707/741 |
| 2016/0321375 | A1 | 11/2016 | Liu et al. |
| 2017/0017683 | A1 | 1/2017 | Fourny et al. |
| 2017/0060912 | A1 | 3/2017 | Liu |
| 2017/0060973 | A1 | 3/2017 | Liu et al. |
| 2020/0210398 | A1 | 7/2020 | Liu |

FOREIGN PATENT DOCUMENTS

| | | |
|---|---|---|
| WO | WO 2008/091705 A2 | 7/2008 |
| WO | WO 2015/069941 A1 | 5/2015 |

OTHER PUBLICATIONS

Chasseur et al., "Enabling JSON Document Stores in Relational Systems", WebDB dated 2013, New York, New York, USA, 16 pages.

Hammerschmidt, Beda, "The new SQL/JSON Query operators (Part5: JSON_TABLE, Nested Path, Ordinality Column)", JSON in the Oracle Database, dated May 18, 2015, 7 pages.

Hatlen, Knut, "Partial update of JSON values", dated Apr. 3, 2018, https://mysqlserverteam.com/partial-update-of-json-values/, 6 pages.

Haw et al., "Data Storage Practices and Query Processing in XML Databases: A Survey", Knowledge-Based Systems, vol. 24, Issue, 8 dated Dec. 2011, pp. 1317-1340.

Hoffman, P. et al., "JSON Merge Patch", Internet Engineering Task Force (IETF), dated Oct. 2014, 9 pages.

Idalko, Tools for Aglie Teams, "CRUD operations with Postgres JSONB", dated May 31, 2017, 18 pages.

ISO/IEC TR, 19075-6, Information technology—Database languages—SQL Technical Reports, "Part 6: SQL support for JavaScript Object Notation (JSON)", First Edition dated Mar. 2017, 112 pages.

Kleppmann et al., "A Conflict-Free Replicated JSON Datatype", dated Aug. 15, 2017, 17 pages.

Li et al., "Closing the functional and Performance Gap between SQL and NoSQL", ACM 978-1-4503-3531-7, dated Jun. 26, 2016, 12 pages.

Adams et al., Orac!e@XML DB Developer's Guide 11g Release, dated May 1, 2008, 972 pages.

Liu et al., "Closing the functional and Performance Gap between SQL and NoSQL", SIGMOD'16, Jun. 26-Jul. 1, 2016, San Francisco, California, USA, 12 pages.

Wikipedia, the free encyclopedia, "Protocol Buffers", last viewed on Dec. 28, 2015, https://en.wikipedia.org/wiki/Protocol_Buffers, 3 pages.

Odle's Oracle Blog, "JSON Patch, Merge Patch, and Redact features in Oracle 18c", dated Aug. 27, 2018, 16 pages.

Oracle Database, "Introduction to Simple Oracle Document Access (SODA)", 18c E86033-04, dated Aug. 2018, 96 pages.

Oracle Database, "Oracle Database JSON Developer's Guide", 21c F30948-01, dated Nov. 2020, 305 pages.

Shukla et al., "Schema-Agnostic Indexing with Azure DocumentDB", Proceedings of the VLDB Endowment, vol. 8, No. 12, Copyright 2015 VLDB, 12 pages.

Tekli et al., "XML Document-Grammar Comparison: Related Problems and Applications", Central European Journal of Computer Science, vol. 1, dated 2011, 14 pages.

Theobald et al., "TopX: Efficient and Versatile Top-K Query Processing for Semistructured Data", The VLDB Journal, vol. 17 issue, dated Jan. 1, 2008, pp. 81-115.

W3C, "Extensible Markup Language (XML) 1.0 (Fifth Edition)" Recommendation dated Nov. 26, 2008, 5 pages.

Wikipedia, the free encyclopedia, "Apache Avro", https://en.wikipedia.org/wiki/Apache_Avro, last viewed on Dec. 28, 2015, 2 pages.

Wikipedia, the free encyclopedia, "BSON", last viewed on Dec. 28, 2015, https://en.wikipedia.org/wiki/BSON, 3 pages.

Liu et al., "A Decade of XML Data Management: An industrial Experience Report from Oracle", ICDE 2009, Shanghai, China, dated Mar. 29, 2009, IEEE, pp. 1351-1362.

U.S. Appl. No. 13/604,402, filed Sep. 5, 2012, Advisory Action, dated Nov. 17, 2014.

Liu, U.S. Appl. No. 14/699,685, filed Apr. 29, 2015, Notice of Allowance, dated Aug. 22, 2017.

Liu, U.S. Appl. No. 14/836,680, filed Aug. 26, 2015, Notice of Allowance, dated Nov. 21, 2018.

Liu, U.S. Appl. No. 14/836,680, filed Aug. 26, 2015, Office Action, dated Apr. 18, 2018.

Liu, U.S. Appl. No. 16/690,817, filed Nov. 21, 2019, Office Action, dated Feb. 4, 2021.

Novoselsky, U.S. Appl. No. 13/604,402, filed Sep. 5, 2012, Final Office Action, dated May 18, 2017.

Novoselsky, U.S. Appl. No. 13/604,402, filed Sep. 5, 2012, Interview Summary, dated Mar. 13, 2018.

Novoselsky, U.S. Appl. No. 13/604,402, filed Sep. 5, 2012, Interview Summary, dated Sep. 21, 2017.

Novoselsky, U.S. Appl. No. 13/604,402, filed Sep. 5, 2012, Notice of Allowance, dated Oct. 29, 2019.

U.S. Appl. No. 12/181,745, filed Jul. 29, 2008, Final Office Action, dated Apr. 19, 2016.

U.S. Appl. No. 12/181,745, filed Jul. 29, 2008, Final Office Action, dated Jul. 9, 2014.

Liu U.S. Appl. No. 14/699,685, filed Apr. 29, 2015, Notice of Allowance, dated Apr. 24, 2017.

U.S. Appl. No. 13/604,402, filed Sep. 5, 2012, Advisory Action, dated Feb. 9, 2016.

(56) References Cited

OTHER PUBLICATIONS

U.S. Appl. No. 12/181,745, filed Jul. 29, 2008, Office Action, dated Feb. 27, 2014.
U.S. Appl. No. 13/604,402, filed Sep. 5, 2012, Final Office Action, dated Jan. 5, 2016.
U.S. Appl. No. 13/604,402, filed Sep. 5, 2012, Final Office Action, dated May 4, 2015.
U.S. Appl. No. 13/604,402, filed Sep. 5, 2012, Final Office Action, dated Jul. 15, 2014.
U.S. Appl. No. 13/604,402, filed Sep. 5, 2012, Interview Summary, dated Mar. 17, 2015.
U.S. Appl. No. 13/604,402, filed Sep. 5, 2012, Interview Summary, dated Jul. 1, 2015.
U.S. Appl. No. 13/604,402, filed Sep. 5, 2012, Office Action, dated Jan. 13, 2015.
U.S. Appl. No. 13/604,402, filed Sep. 5, 2012, Office Action, dated Aug. 11, 2015.
U.S. Appl. No. 13/604,402, filed Sep. 5, 2012, Office Action, dated Oct. 20, 2016.
U.S. Appl. No. 14/498,893, filed Sep. 26, 2014, Notice of Allowance, dated Jan. 13, 2017.
U.S. Appl. No. 14/498,893, filed Sep. 26, 2014, Office Action, dated Aug. 12, 2016.
U.S. Appl. No. 12/181,745, filed Jul. 29, 2008, Final Office Action, dated Oct. 7, 2015.
Liu, Zhen Hua, "JSON Data Management in RDBMS", https://www.igi-global.com/chapter/json-data-management-in-rdbms/230682, DOI: 10.4018/978-1-5225-8446-9.ch002, dated 2019, 27 pages.
Liu et al., "Native JSON Datatype Support: Maturing SQL and NoSQL Convergence in Oracle Database", Proceedings of the VLDB Endowment, vol. 13, No. 12, DOI: https://doi.org/10.14778/3415478.3415534, dated Aug. 2020, 14 pages.
Liu et al., "JSON Data Management—Supporting Schema-less Development in RDBMS", InfoComp 2012: The Second International Conference on Advanced Communications and Computation, http://dx.doi.org/10.I I 45/2588555.2595628, dated Jan. 2014, 12 pages.

* cited by examiner

FIG. 4

JSON DOCUMENT 400

```
{"person" : {
  "name" : "John",
  "birthdate" : "1996-08-09",
  "creditScore" : [700, 790, 750],
  "LoanHistory" : [ {
    "type" : "car",
    "amount" : 18000,
    "itemized" : [
      {
        "loandate" : "2005-01-03",
        "amount" : 10000
      },{
        "loandate" : "2006-12-01",
        "amount" : 8000}
    ]},{
    "type": "student", "amount" : 30000,
    "itemized" : [
      {
        "loandate": "2002-05-04",
        "amount" : 14000
      },{
        "loandate" : "2004-05-07",
        "amount" : 16000
    }]},{
    "type": "medicine" , "amount" : 2000,
    "itemized" : [
      {
        "loandate" : "2008-09-04",
        "amount" : 2000
      }
    ]}
]}
```

DDL STATEMENT 500

```
create MULTIVALUE index LoanDetailIdx on jtab (
JSON_TABLE (jcol , '$.person' error on error  null on empty
COLUMNS
    bd PATH '$.birthdate.date()',
    NESTED PATH '$.LoanHistory[*]'
    COLUMNS (typec PATH '$.type.string()',
             amount PATH '$. amount.number()',
             ord1 FOR ORDINALITY,
             NESTED PATH '$.itemized[*]'
             COLUMNS (loandat PATH '$.loandate.date()',
                      Loanamount PATH '$.amount.number(),
                      ord2 FOR ORDINALITY))))
```

FIG. 5

TECHNIQUE OF COMPREHENSIVELY SUPPORTING MULTI-VALUE, MULTI-FIELD, MULTILEVEL, MULTI-POSITION FUNCTIONAL INDEX OVER STORED AGGREGATELY STORED DATA IN RDBMS

RELATED CASE

Incorporated in its entirety herein is related U.S. Pat. No. 9,659,045 GENERIC INDEXING FOR EFFICIENTLY SUPPORTING AD-HOC QUERY OVER HIERARCHICAL MARKED-UP DATA filed Sep. 26, 2014 by Zhen Hua Liu et al.

FIELD OF THE INVENTION

The present invention relates to JavaScript object notation (JSON) documents in a relational database. Herein are multilevel, multifield, multivalued techniques for indexing and querying.

BACKGROUND

JavaScript object notation (JSON) is a hierarchical data specification language. A JSON object is a hierarchically marked content object that comprises a collection of fields, each of which is a field name/value pair. A field name is in effect a tag name for a node in a JSON object. The name of the field is separated by a colon from the field's value. A JSON_value may be:
  An object, which is a list of fields enclosed in braces "{ }" and separated within the braces by commas.
  An array, which is a list of comma separated JSON values enclosed in square brackets "[ ]".
  A field value, which is a string, number, true, false, or null.
The following JSON object J is used to illustrate JSON.

```
{
    "CUSTOMER": "EXAMPLE LIMITED",
    "CUSTOMER TYPE": "BUSINESS",
    "ADDRESS": {
        "STREETADDRESS": "101 99TH STREET",
        "CITY": "NORTH POLE",
        "STATE": "AK",
        "POSTALCODE": "95110"
    },
    "PHONENUMBERS": [
        "408 555-1234",
        "408 555-4444"
    ]
}
```

Object J contains fields CUSTOMER, CUSTOMER TYPE, ADDRESS, STREETADDRESS, CITY, STATE, POSTALCODE, and PHONENUMBERS. CUSTOMER and CUSTOMER TYPE have string values "EXAMPLE LIMITED" and "BUSINESS", respectively. ADDRESS is an object containing member fields STREETADDRESS, CITY, STATE, and POSTALCODE. PHONENUMBERS is an array comprising string values "408 555-1234" and "408 555-4444". A field such as POSTALCODE may be subsequently parsed as another primitive datatype such as an integer such as for: schematic validation, storage that is compact and/or strongly typed, and/or analytics or further processing such as arithmetic.

Within object J is a containment hierarchy of nested content enclosed in shown curly braces and arranged as a sequence of hierarchical levels. For example as shown above, ADDRESS operates as both a field itself in a previous level and an aggregation of nested fields in a next level. As explained later herein, levels are used for navigation within object J such as according to a multilevel path expression for identifying a nested field. Also as explained later herein, different JSON objects in a same data store may have a same or different count of levels that contain same or different fields. In other words, JSON objects may conform to a same structural schema that reflects structural similarity, including levels and contents of levels, or may be operated in a schema-less way and have structurally dissimilar contents. Techniques for inspecting and navigating multilevel objects are presented in related U.S. Pat. No. 9,659,045.

Efficient querying is important to accessing JSON documents. Effective approaches for querying JSON documents include schema-based approaches. One schema-based approach is the schema-based relational-storage approach. In this approach, collections of JSON documents are stored as schema instances within tables of a database managed by a database management system (DBMS). That approach leverages the power of object-relational DBMS's to index and query data. In general, the schema-based relational-storage approach involves registering a schema with a DBMS, which generates tables and columns needed to store the attributes (e.g. elements, fields) defined by the schema.

Storing a collection of JSON documents as instances of a schema may require developing a schema that defines many if not all attributes found in any member of a collection. Some or many of the attributes defined by the schema may only occur in a relatively small subset of the collection members. The number of attributes defined by a schema may be many times larger than the number of attributes of many collection members. Many attributes may be sparsely populated. Managing schemas with a relatively large number of attributes, some or many of which may be sparsely populated, can be burdensome to a DBMS and administrators and users of the DBMS.

To avoid pitfalls of using schema-based approaches, schema-less approaches may be used. One schema-less approach is the partial projection approach. Under the partial projection approach, a set of commonly queried attributes of the collection are projected and copied into columns of additional tables; these tables exist to support DBMS indexing of the columns using, for example, binary tree or bit map indexing.

Being a minimalist semi-structured data model, JSON is a de-facto standard for schema-less development in database markets. Both RDBMS vendors and No-SQL vendors have supported JSON functionality to various degrees. The current status is that most RDBMS vendors support JSON text storage as whole documents and apply structured query language (SQL) and/or JSON operators over the JSON text, as is specified by the SQL/JSON standard. However, storing whole documents makes indexing more difficult and/or less useful. For example, existing JSON indices for relational databases limit how many fields and which fields are indexed by a same index, which limits general applicability and may encourage a proliferation of indices, even for a single query. For example in above JSON object J, typical index approaches are unable to index both of CUSTOMER TYPE and STATE fields because those fields occur at different levels in JSON object J. For example, execution of a query that seeks business customers in Alaska may need to use separate indices for filtering two fields at different levels such as CUSTOMER TYPE and STATE.

The approaches described in this section are approaches that could be pursued, but not necessarily approaches that have been previously conceived or pursued. Therefore, unless otherwise indicated, it should not be assumed that any of the approaches described in this section qualifies as prior art merely by virtue of their inclusion in this section.

BRIEF DESCRIPTION OF THE DRAWINGS

In the drawings:

FIG. 4 depicts an example complex JSON document;

FIG. 5 depicts an example data definition language (DDL) statement;

DETAILED DESCRIPTION

Figure 1:
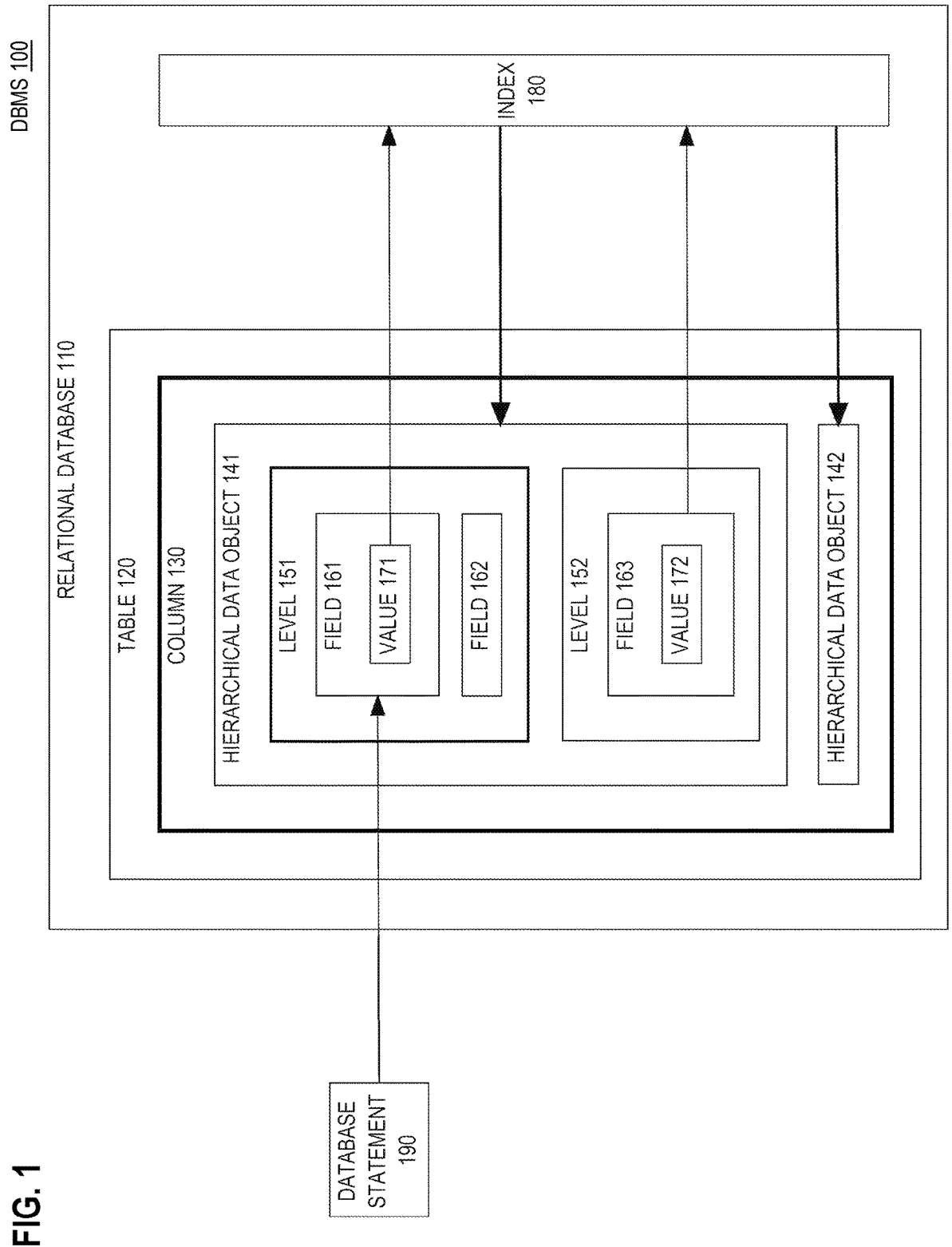
FIG. 1 is a block diagram that depicts an example computer that provides multilevel, multifield, multivalued indexing and query execution for hierarchical data objects stored in a table in a relational database.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

Techniques herein operate a multi-value, multi-field, multilevel, multi-position functional index over hierarchical data objects stored in a single column of a database table in a relational database management system (RDBMS). Hierarchical data objects may contain nested structures and arrays that are indexed in novel ways and novel granularities. For example, a multi-value, multi-field, and multi-level index may have two index keys, a first that is a field at one level and a second that is an array element at a position within the array.

Included herein are enhanced data definition language (DDL) for index creation and data manipulation language (DML) rewrite transformations to leverage the index. The index is maintained when performing DML operations on the indexed data. Index maintenance may be minimized or even avoided by analyzing path-based DML operation both at statement compile time and run time.

RDBMSs herein store application-level objects or documents as hierarchical data objects to support flexible schema management and, in some ways, schema-less operation. RDBMSs herein support native storage of hierarchical data objects such as JavaScript object notation (JSON), extensible markup language (XML), or other complex application-level objects, which may be aggregately stored in one large object (LOB) column. Indexing techniques herein include path navigation to efficiently support a range predicate query over scalar and array data fields that are embedded inside the hierarchical data objects. Indexes are defined using structured query language (SQL) table function definition, such as JSON_TABLE( ) and XMLTABLE( ) to express multi-value, multi-field, multilevel, multi-position functional indexing. In general, the table functions describe keys to index as output in relational form and from which fields or elements in hierarchical data objects to extract content for the output.

Approaches herein completely avoid materializing a copy of content in hierarchal data objects as relational data in so-called side tables. Consequently, index storage space and indexing maintenance time are decreased. The approached may also enable a simple migration path for users that already use a JSON_TABLE( ) materialized view to speed up a JSON_EXISTS( ) query or an XMLTABLE( ) materialized view to speed up an XMLEXISTS( ) query.

The approaches bridge the gap of classical functional indexing in an RDBMS that cannot index array values. Indexing solutions herein provide indexing at multiple levels in hierarchical data objects. JSON and XML path (XPath) navigational languages heavily depend on navigation of content at different levels in hierarchical data objects.

In an embodiment, an RDBMS stores, in a table, many hierarchical data objects that respectively contain multiple levels that respectively contain one or more fields. An index is generated for indexed values in fields in at least two of the multiple levels. The index is used to execute a database statement that references at least one of the indexed fields.

Approaches herein provide unprecedented acceleration in various ways as follows. Indices herein provide matching to more fields in more levels of hierarchical data objects thereby decreasing or eliminating further filtering by brute force after index access. For example, matching ordinal positions within an array field needs no further filtration after index access. Likewise, duplicate value counting within an array field may occur based solely on index access for acceleration. While other approaches may need multiple indices to handle multiple fields and/or multiple levels, a single index herein provides increased spatial locality of index entries for acceleration. Various ways of minimizing index maintenance for acceleration are described.

1.0 Example Computer

FIG. 1 is a block diagram that depicts an example database management system (DBMS) 100, in an embodiment. DBMS 100 provides multilevel, multifield, multivalued indexing and query execution for hierarchical data objects 141-142 stored in table 120 in relational database 110. DBMS 100 may be hosted by one or more computers such as a rack server such as a blade, a personal computer, a mainframe, a virtual computer, or other computing device.

DBMS 100 hosts and/or operates relational database 110. For example, DBMS 100 may be a relational DBMS (RDBMS) that processes and administers content of relational database 110. Relational database 110 contains table 120 that contains column 130. Definitions of table 120 and/or column 130 may be stored in a database dictionary that stores schematic metadata in relational database 110. Column 130 stores hierarchical data objects 141-142 that may be semi-structured documents such as JavaScript object notation (JSON) or extensible markup language (XML), a document object model (DOM), or nested data objects such as a logical tree or data containment hierarchy. Embodiments may store hierarchical data objects 141-142 in column 130 as text or binary data. For example, the datatype of column 130 may be a large object (LOB) such as a character LOB (CLOB) or binary LOB (BLOB). Each of hierarchical data objects 141-142 is stored in a separate respective row of table 120.

Column 130 may contain numerous hierarchical data objects. Table 120 may contain other columns that do or do not store other hierarchical data objects. Each column may store content of a respective type. Relational database 110 may contain other tables that do or do not store other hierarchical data objects.

Hierarchical data object 141 contains a sequence of levels 151-152 that contain respective field(s). For example, level 151 contains fields 161-162 that may have same or different respective datatypes. As explained earlier herein, levels are used for navigation within hierarchical data object(s) such as according to a multilevel path expression for identifying a nested field. Essentially, a hierarchical data object may be operated as a logical tree data structure of interconnected nodes, where each node is a respective field in the hierarchical data object. The nodes of the tree are logically arranged into levels so that child nodes of a same parent node occur in a same level that is adjacent to the level of the parent node. In that structural way, multiple fields may be nested in an enclosing field. Nesting of fields provides a containment hierarchy, which causes a hierarchical data object to be hierarchical.

Although not shown, hierarchical data objects 141-142 may contain same or different counts of levels. In other words as logical trees, hierarchical data objects 141-142 may have different heights. Hierarchical data objects 141-142 may contain same or different fields at a same level. For example, same field 161 may be stored in different levels of hierarchical data objects 141-142 such as in first level 151 as shown in hierarchical data object 141 but in a different level or multiple levels in hierarchical data object 142. Same field 161 may contain a same or different respective value in respective hierarchical data objects 141-142. For example in hierarchical data object 141, field 161 stores value 171 that may be a scalar such as a string or number or an array of multiple scalars. In an embodiment, a scalar may be stored and/or processed as if it were an array having only one element or vice versa.

1.1 Index for Hierchical Data Objects

In relational database 110, DBMS 100 creates, populates, and maintains index 180 that indexes hierarchical data objects 141-142 based on respective field(s) in multiple levels such as levels 151-152. For example, index 180 may index fields in three adjacent or non-adjacent levels of some many available levels such as five expected levels or an indefinite count of levels. If hierarchical data object 142 lacks a level that index 180 indexes, then index 180 does not index hierarchical data object 142. Configuration and population of index 180 are discussed later herein.

At runtime and after population of index 180 based on column 130, DBMS 100 may receive database statement 190 that accesses column 130 and refers to field(s) such as field 161 such as in a predicate in database statement 190. Execution of database statement 190 is accelerated by using index 180. Database statement 190 need not expressly reference index 180. Database statement 190 need not reference all fields nor all levels that index 180 indexes. Examples of database statement 190 and statement execution and acceleration are presented later herein.

DBMS 100 uses index 180 to determine which of hierarchical data objects 141-142 satisfy a predicate in database statement 190 such as for filtration. For example, database statement 190 may read and/or write one, some, or all of hierarchical data objects 141-142. In any case, database statement 190 may be data manipulation language (DML), structured query language (SQL), and/or query by example (QBE). SQL embodiments are discussed later herein. DBMS 100 may answer database statement 190 by sending a result that contains value(s), level(s), hierarchical data object(s), and/or computed value(s). The result may be encoded in a same or different format as used within column 130. For example, column 130 may store binary encoded JSON, but database statement 190 and its response may instead contain text encoded JSON.

2.0 Example Indexing Process

Figure 2:
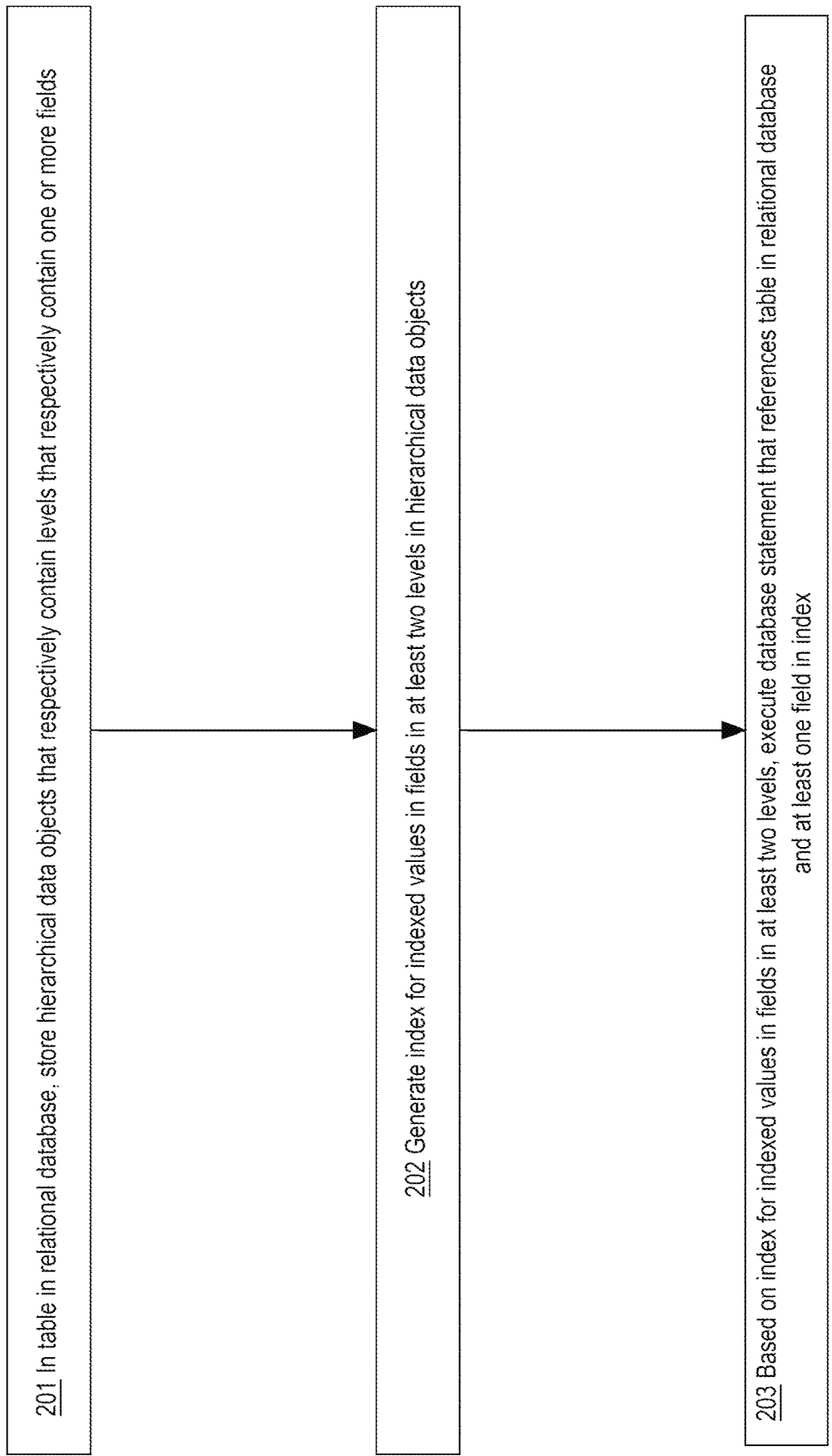
FIG. 2 is a flow diagram that depicts an example computer process for providing multilevel, multifield, multivalued indexing and query execution for hierarchical data objects stored in a table in a relational database.

FIG. 2 is a flow diagram that depicts DBMS 100 providing, based on index 180, multilevel, multifield, multivalued indexing and query execution for hierarchical data objects 141-142 stored in column 130 in table 120 in relational database 110 in an embodiment. FIG. 2 is discussed with reference to FIG. 1.

Steps 201-203 may occur at various respective times in various scenarios. For example, step 201 may occur during initial data ingestion such as by extraction, transformation, and loading (ETL) or continuously such as when hierarchical data objects 141-142 arrive in a live stream. Step 202 may occur during system administration such as by a database administrator (DBA) or continuously with streaming. Step 203 may occur at runtime and may entail data manipulation language (DML) such as a query that is or is not ad hoc.

In column 130 in table 120 in relational database 110, step 201 stores hierarchical data objects 141-142 that respectively contain levels such as levels 151-152 that respectively contain field(s) such as fields 161-163 that contain values such as values 171-172. Each hierarchical data object is stored in a separate respective row in table 120. For example, additional rows may be inserted into table 120 whenever new hierarchical data objects are received.

Step 202 generates index 180 for indexed values in fields in at least two levels in hierarchical data objects in column 130. In an embodiment, index 180 contains references to rows of table 120 that contain hierarchical data objects that contain contents that satisfy indexing criteria of index 180. A reference to a row may be a row identifier (ROWID), an array offset, a memory address pointer, or a file pointer such as having a logical block address (LBA) plus a byte offset. As explained later herein, indexing criteria may identify fields and/or levels, and/or may contain a predicate, a regular expression, and/or hierarchical traversal paths such as a JSON expression or an XML path (XPath). In an embodiment, index 180 contains the indexed values of fields. For example, indexing criteria may specify indexing of fields 162-163 in all hierarchical data objects in column 130, in which case index 180 contains the indexed values of fields 162-163. Data storage and structure within index 180 are discussed later herein. An example index creation DDL statement is presented later herein.

Based on index 180 for indexed values in fields in at least two levels, step 203 executes database statement 190 that references table 120 in relational database 110 and at least one indexed field in index 180. For example, index 180 may index fields 162-163, and database statement 190 references index field 162 and/or 163. Step 203 may or may not entail updating contents of column 130, table 120, and/or index 180 according to scenarios discussed later herein. Example SQL queries that index 180 accelerates are presented later herein.

3.0 Example Index Usage Activities

Figure 3:
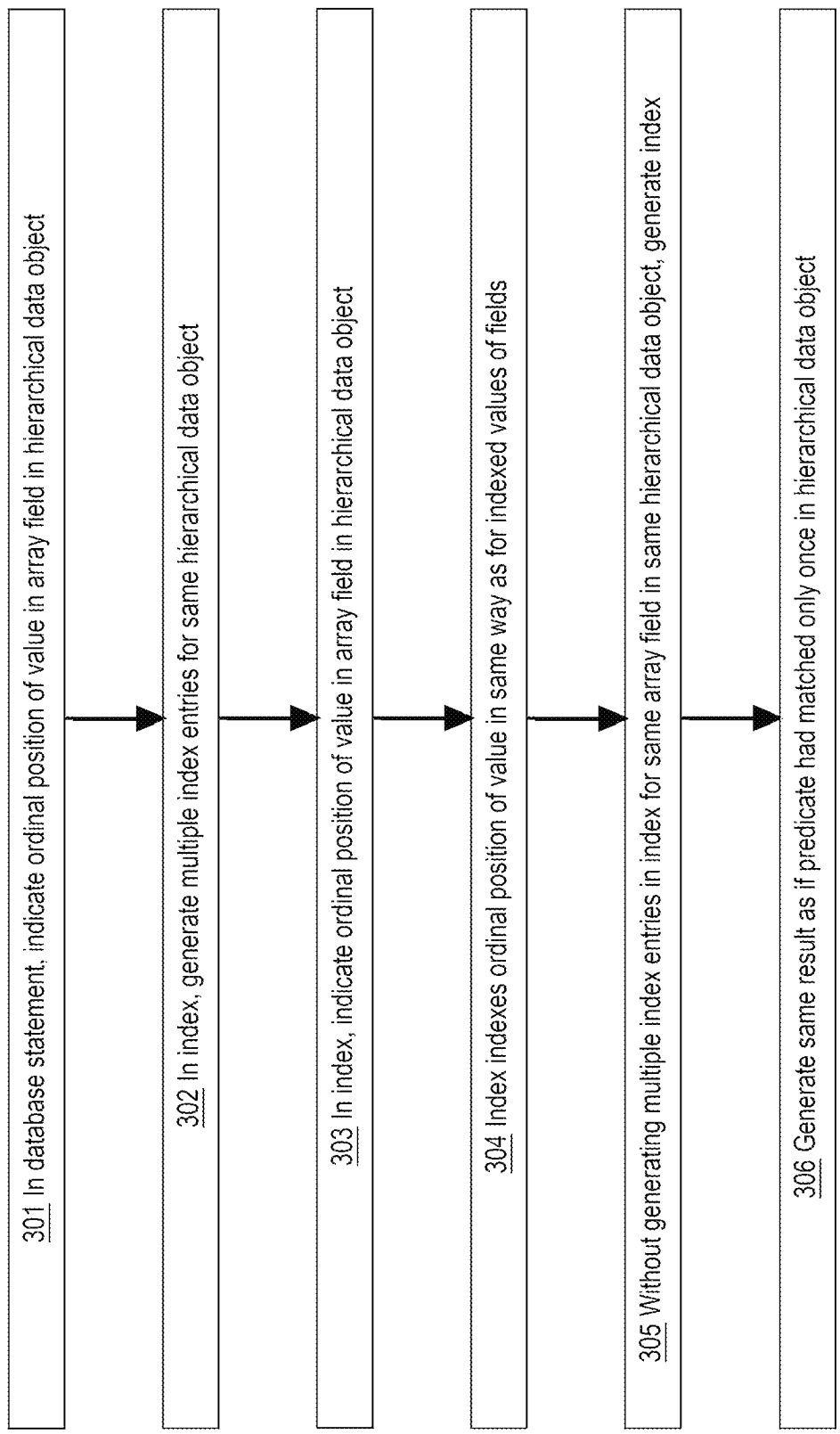
FIG. 3 is a flow diagram that depicts example index usage activities.

FIG. 3 is a flow diagram that depicts example index activities that DBMS 100 may implement for generating and using index 180. FIG. 3 is discussed with reference to FIG. 1.

As explained earlier herein, field 161 may be an array field such that hierarchical data object 141 has multiple values for same field 161. For example, field 161 may contain many temperature numbers as time series data from a same thermometer. Per step 301, database statement 190 indicates the ordinal position of a value that occurs in field 161. For example, database statement 190 may contain the following ordinal WHERE clause.

--- where json_exists(ja.jcol,
'$.sensor?(@.temperature[2] > 0.5')

---

The following terms have the following meanings in the above ordinal where clause:
- json_exists detects which hierarchical data objects match a predicate
- ja identifies table 120
- jcol identifies column 130
- $.sensor? identifies level 151
- @.temperature identifies field 161
- [2] identifies an ordinal position of a temperature value in the array field In a demonstrative embodiment, index 180 comprises a lookup table for indexing fields 161 and 163 in different respective levels 151-152. Index 180 is multilevel because it indexes fields 161 and 163 that occur at different respective levels in hierarchical data objects. For demonstration, the above ordinal WHERE clause refers to only one level 151. Applying index 180 to an example WHERE clause that instead refers to multiple levels is presented later herein.

In this example, field 161 may be a temperature array, and field 163 may be a thermometer manufacturer name. In a non-scalar embodiment, values 171-172 may occur together as a tuple that operates as a lookup key into index 180 to retrieve identifiers of matching hierarchical data objects in column 130, even if value 171 or 172 is an array and not a scalar. For example, database statement 190 may ask which Oracle-made thermometers have no temperatures yet, and index 180 may provide ROWIDs of matching hierarchical data objects. In an embodiment, the lookup key tuple may contain an array and a string respectively for fields 161 and 163. Each entry in the lookup table in index 180 may map one lookup key tuple to a list of ROWIDs of matching hierarchical data objects. As discussed later herein, index 180 may comprise a B+ tree instead of a lookup table, and both implementations may use a same lookup key tuple format.

In a scalar-tuple embodiment, the lookup key tuple instead contains only scalar values such as a number for field 161, which is only one temperature even though field 161 is an array. In index 180, step 302 generates multiple index entries with multiple respective lookup key tuples for same hierarchical data object 141. Each of those lookup key tuples has a separate temperature value. For example in hierarchical data object 141, if array field 161 has a value of [0.6, 0.9, 0.7] and field 163 has a value of Oracle, then three lookup key tuples may be [0.6, Oracle], [0.9, Oracle], and [0.7, Oracle] for three respective index entries. Each of those three index entries would map to a respective list of matching ROWIDs, and each of those three lists would contain at least the same ROWID of hierarchical data object 141.

3.1 Example Query Accelerations

Using the scalar-tuple embodiment of index 180 may be enhanced as follows to accelerate evaluation of the above ordinal WHERE clause. In index 180, step 303 indicates the ordinal position of a value in array field 161 by including the zero-based ordinal position in the lookup key tuple. For example, [0.7, 2, Oracle] may be a lookup key tuple that indicates that 0.7 is the third temperature in the array. In that way, step 304 indexes the ordinal position in the same way as if it were another indexed field in index 180.

As time series data, temperature field 161 may instead contain ten years of hourly temperatures, which is 87,600 values, many or most of which may be adjacent or non-adjacent duplicates. In the scalar-tuple embodiment, there are 87,600 ordinal positions and thus 87,600 different lookup key tuples for same hierarchical data object 141 because each ordinal position has its own index entry for a same array field of a same hierarchical data object, which may greatly inflate the size of index 180.

A reduction in the size of index 180 is possible because semantics of json_exists( ) entails calculating exactly one Boolean true or false as a match result respectively for each hierarchical data object in column 130. In other words, most json_exists usages do not need index 180 to index duplicate values, count duplicate values, nor have ordinal positions for values in an array field, such as with the following non-ordinal WHERE clause.

--- where json_exists(ja.jcol,
'$.sensor?(@.temperature[*] > 0.5')

---

In the above non-ordinal WHERE clause, [*] is a wildcard that means any ordinal position in the temperature array. In the above non-ordinal WHERE clause, it does not matter that many or all temperature values may match the predicate, because the result is the same so long as at least one ordinal position has a temperature value that matches. In various embodiments, DBMS 100 automatically detects, or a database administrator (DBA) manually indicates, that index 180 will not be used in a way that needs duplicates nor ordinal positions and index 180 should create only one index entry per distinct value in array field 161 for a same hierarchical data object. For example, DBMS 100 may automatically analyze historical queries to detect that duplicates and ordinal positions in array field 161 are always ignored, such as with queries that ask for a maximum value in an array field or whether an array field contains a particular value. Without generating multiple index entries in index 180 for duplicate values in array field 161 of hierarchical data object 141, step 305 generates only a single index entry for the same value in array field 161 of hierarchical data object 141. For example, if temperature has only a single digit of precision, then there are only ten possible temperature values, and index 180 would have at most ten index entries for array field 161 of hierarchical data object 141, even though array field 161 of hierarchical data object 141 may contain thousands of duplicate values.

As explained above, semantics of json_exists( ) entails calculating exactly one Boolean for hierarchical data object 141. Even though an embodiment of index 180 may have only one index entry per distinct value in array field 161 of hierarchical data object 141, array field 161 of hierarchical data object 141 may still have multiple matching values, such as when array field 161 contains [0.6, 0.9, 0.7], which causes three index entries for three distinct values. In that case for json_exists, computer 180 should ignore multiple matching index entries for same hierarchical data object 141. In other words, json_exists should not return duplicate ROWIDs. Thus when the above non-ordinal WHERE clause matches multiple index entries for hierarchical data object 141, step 306 still generates a same result as if the predicate in the above non-ordinal WHERE clause had matched only once in hierarchical data object 141.

4.0 Example JSON Document

Figure 6:
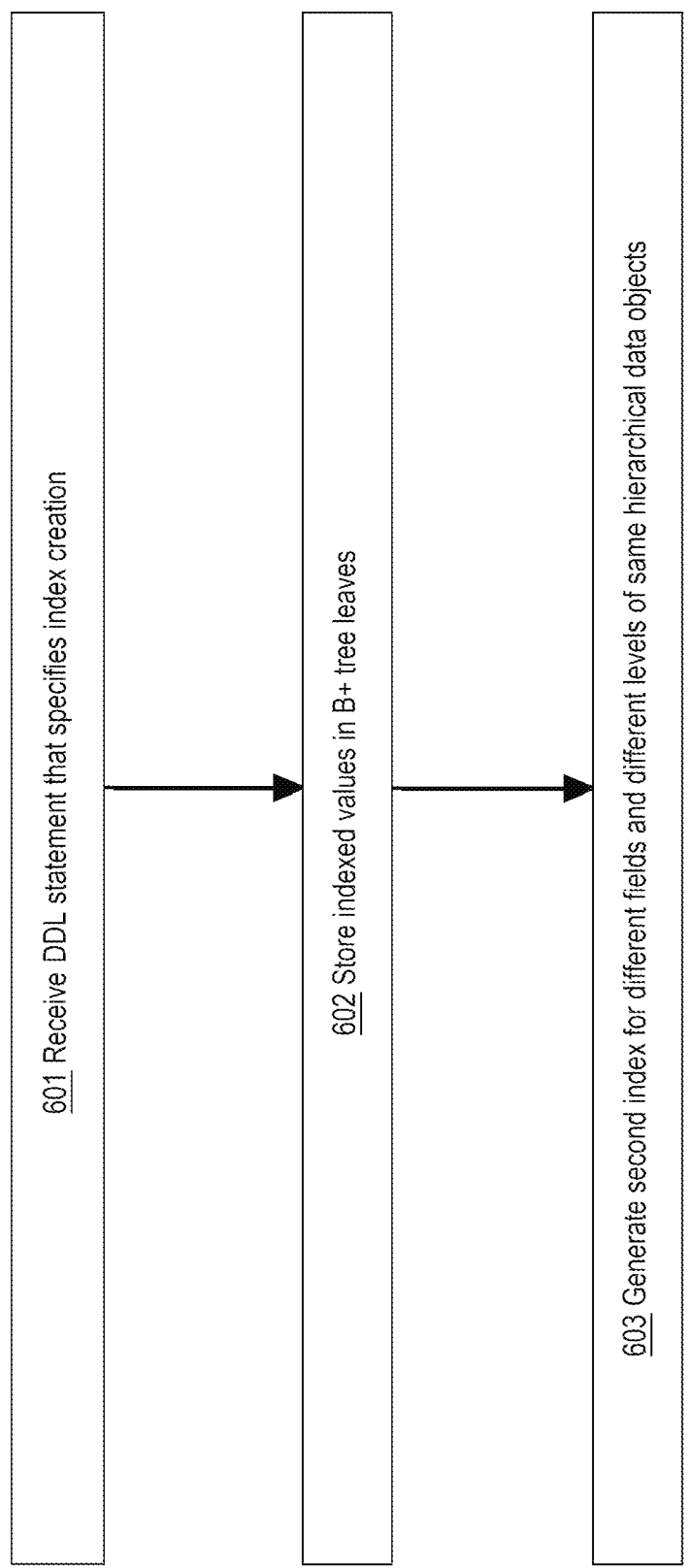
FIG. 6 is a flow diagram that depicts an example computer process for generating indices.

FIGS. 4-6 illustrate an exemplary embodiment as follows. FIG. 4 depicts example complex JSON document 400. FIG. 4 is discussed with reference to FIG. 1. Column 130 of FIG. 1 may store JSON document 400 that contains many arrays and many levels as discussed below for FIGS. 5-6.

5.0 Example DDL Statement

FIG. 5 depicts example DDL statement 500 in an embodiment. FIG. 5 is discussed with reference to FIGS. 1 and 4.

The following terms have the following meanings in DDL statement 500 that specifies creation of index 180.
- MULTIVALUE is a novel keyword that indicates that index 180 can contain multiple index entries for a same hierarchical document object
- jtab is table 120
- jcol is column 130
- JSON_TABLE( ) is a table function that returns one or more rows per hierarchical data object in column 130
- COLUMNS( ) lists indexed JSON fields
- bd PATH is a SQL column alias for an indexed field
- NESTED PATH means a nested level within the hierarchical data object
- [*] means that each element of an array field provides a separate row in the result of the table function
- ord1 FOR ORDINALITY means that ord1 is a synthetic indexed field for ordinality positions in the LoanHistory array field As explained above, JSON_TABLE is a table function. An embodiment may instead use XMLTABLE as a table function for XML, documents. For example if column 130 instead contains XML documents, then index 180 may accelerate an XMLEXISTS( ) WHERE clause. In either case, the table function is responsible for flattening a whole hierarchical data object or a tree path or subtree from the hierarchical data object into one or more data rows in the table returned by the table function. Flattening and denormalization are complementary ways of rearranging hierarchical data into tabular data as follows.

An embodiment of the table function may return one or multiple rows per hierarchical data object as follows. Despite potentially coming from different levels in a same hierarchical data object, NESTED PATHs are flattened into a same row in the result of the table function. For example, columns bd and type come from fields in different levels but occur in a same row for the table function.

Because each element of an array field referenced by [*] provides a separate row for the table function, denormalization is needed as follows. Denormalization entails duplicating data in multiple rows for the table function. Values from fields in a same or higher level as an array field are duplicated in each table row provided by the array field. For example, array field itemized[*] may contain two loan disbursements and provide two table rows. In both of those table rows, column bd will contain a same repeated value. In an embodiment, index 180 generates multiple respective index entries for the multiple rows that a table function returns for a same hierarchical data object. An embodiment may have other table functions that flatten other kinds of hierarchical data objects into data rows in different ways.

In the following demonstrative example, column 130 contains only JSON document 400, in which case the following example table T shows rows that would be returned by the JSON_TABLE( ) table function in DDL statement 500.

| bd | typec | amount | ord1 | loandat | Loanamount | ord2 |
|---|---|---|---|---|---|---|
| 1996 Aug. 9 | car | 18000 | 0 | 2005 Jan. 3 | 10000 | 0 |
| 1996 Aug. 9 | car | 18000 | 0 | 2006 Dec. 1 | 8000 | 1 |
| 1996 Aug. 9 | student | 30000 | 1 | 2002 May 4 | 14000 | 0 |
| 1996 Aug. 9 | student | 30000 | 1 | 2004 May 7 | 16000 | 1 |
| 1996 Aug. 9 | medicine | 2000 | 2 | 2008 Sep. 4 | 2000 | 0 |

The following aspects are demonstrated in the above example table T. A column name need not be identical to its field name. For example, two fields in different levels have a same field name "amount" but the respective columns have different names. Although not shown, table T may contain a column that, in each row of table T, stores a respective identifier of the hierarchical data object that provided content for that row. For example, that column may store ROWIDs that identify hierarchical data objects. In an embodiment, an index entry may be generated for each row of table T and inserted into index 180. Thus, an embodiment may use table T to populate index 180. In any case, index 180 may outlive table T. For example as discussed later herein, index 180 may be a B+ tree that is populated based on rows of table T, after which table T may be discarded and index 180 may be retained to accelerate future queries.

Zero-based ordinal serial numbers in a child level reset to zero when an ordinal serial number of a parent level is incremented. For example when ord1 is incremented from zero to one, ord2 is reset to zero. Duplicate values caused by denormalization entirely or partially fill some columns.

Flattening causes each row to contain values from fields that occur in different levels of JSON document 400.

In an embodiment, table T contains only columns that are needed to populate index 180, which are at least those columns that are populated from fields that are indexed by index 180. Some fields and/or levels need not be indexed and do not contribute data to the above example table T. For example, field "name" has no column in the above example table T and is not indexed by index 180. Although fields nested within an array field may correspond to columns, the array field itself need not have a column. For example, the LoanHistory field itself does not have a column. Whereas in another example table function not shown, the creditScore field in JSON document 400 may correspond to a score column and possibly also an ordinal column.

In an embodiment, only one or a few rows of table T are materialized at a time. For example, a buffer may store a few rows of table T that are used to generate index entries and are then discarded so that other rows of table T can be buffered. For example, table T may contain multiple rows from each of many hierarchical document objects, and only rows from one hierarchical data object may be buffered at any time. In an embodiment, pipeline parallelism facilitates buffering later rows while concurrently generating index entries for earlier rows of table T.

6.0 Example Index Acceleration

FIG. 6 is a flow diagram that depicts DBMS 100 generating indices in an embodiment. FIG. 6 is discussed with reference to FIGS. 1 and 4-5.

Step 601 receives DDL statement 500 that specifies creation of index 180. In an embodiment, index 180 comprises a B+ tree. For persistence, a B+ tree is a search tree that is optimized for input/output (I/O) by minimizing link traversals between tree nodes. A B+ tree has high fan-out (children per parent), high width (leaf count), and low height (level count). Thus, tree descent paths are short such that any tree leaf can be reached from the tree root in very few traversals. In an embodiment, only leaf nodes store index entries. In an embodiment, all of the leaf nodes are daisy-chained together to form a linked list such that, after reaching any leaf node, subsequent leaf nodes can be scanned without repeated tree descent. In an embodiment, each leaf node stores many index entries such that the linked list of leaves is a segmented list. In an embodiment, each tree node is persisted in its own disk block.

As explained earlier herein, NESTED PATHs in DDL statement 500 configure index 180 to index fields in three levels in hierarchical data objects. Likewise, index 180 can accelerate DML statements that access any or all indexed fields respectively in any or all of those three levels. The following multilevel WHERE clause accesses indexed fields that occur in all three levels.

```
where json_exists(ja.jcol,
'$.person?(@.birthdate.date( ) > "1996-01-01" &&
@.LoanHistory[2] ?(@.type = "car" && @.amount >= 10000 &&
@.itemized[*] ?(@.loandate.date ( ) > "2004-01-01" && @.amount
<10000) ) )')
```

In an embodiment, a path expression in a DML, or DDL statement may contain (without quotes) that is a double dot that indicates skipping any count of levels. That is, an expression that contains a double dot may have multiple matches at different levels in same or different hierarchical data objects. With or without level skipping, lookup key tuples may have a same format. For example, a same field may occur only once in each hierarchical data object but at different levels in different hierarchical data objects. A first value in a lookup key tuple may correspond to that field, even though different levels are involved for different hierarchical data objects. In other words, levels may be more or less irrelevant for lookup key tuples that are effectively flattened such as follows.

6.3 Example Index Entry Architecture

In an embodiment, lookup key tuples are one dimensional, even though DDL statement 500 has NESTED PATHs and JSON document 400 is multilevel. That is, a lookup key tuple is flat even though index 180 is multilevel, which means that index 180 indexes fields at different levels in hierarchical data objects. Whether or not an index is multilevel depends on the fields that it indexes and not the internal architecture of the index. A multilevel index does not mean that the index's internal structure has multiple levels such as levels in a B+ tree, even if index 180 has a B+ tree that has multiple tree levels. For example, a multilevel JSON document {A:a, B:{C:c, D:d}} may have a flat lookup key tuple that is [a, d] if multilevel index 180 indexes only fields A and D.

For example, each row in earlier example table T may: a) represent a distinct respective lookup key tuple, and/or b) correspond to a distinct respective index entry in index 180. For example as discussed earlier herein, an index entry may be generated from each row of table T. In an embodiment, each index tree leaf contains at least one index entry that contains: a) one lookup key tuple, and b) a set of ROWIDs of matching hierarchical data objects. Because a lookup key tuple contains some indexed values, step 602 stores indexed values in B+ tree leaves in index 180. In an embodiment, ROWID is instead treated as an indexed field such that any index entry, contained in an index tree leaf, contains exactly one ROWID.

As explained earlier herein, a ROWID corresponds to a distinct row in column 130, not a distinct row in a row set provided by a table function such as the rows in earlier example table T. For example, a ROWID may identify JSON document 400. If all of the rows in example table T are based on same JSON document 400, then all of the index entries that correspond to the rows in example table T may be multiple index entries that contain a same ROWID.

Per DDL statement 500, index 180 indexes only a subset of fields that occur in hierarchical data objects. For the same hierarchical data objects in column 130, step 603 generates a different index for same or different fields in same or different levels as index 180 has. Thus, column 130 may have many multilevel indices. For example as shown, index 180 indexes field 162 in level 151 and field 163 in level 152, which may accelerate a query that filters based on both fields 162-163. A query that only filters field 163 that is at the deeper level may instead be more accelerated by a separate index that only indexes field 163 and possibly also indexes fields in a same or deeper level but not fields in an enclosing level such as level 151.

7.0 Index Maintenance Acceleration

Figure 7:
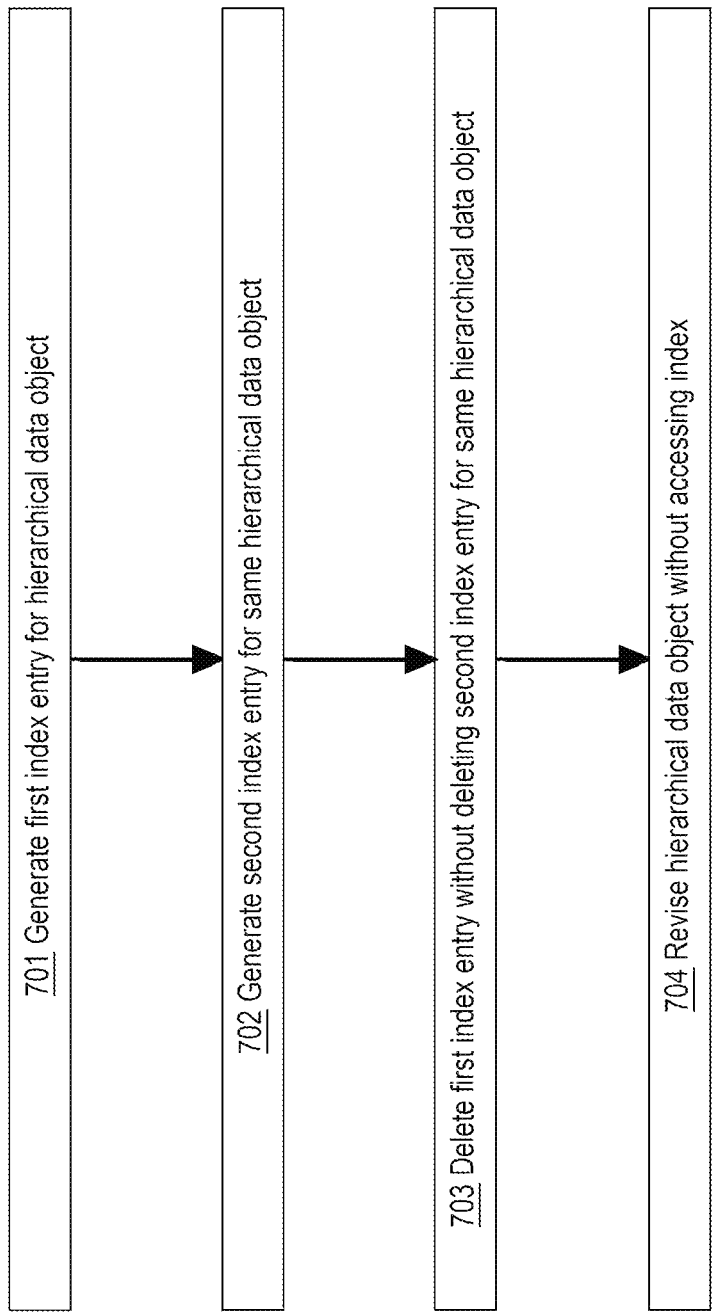
FIG. 7 is a flow diagram that depicts accelerated index maintenance.

FIG. 7 is a flow diagram that depicts continued maintenance of index 180 in an embodiment. FIG. 7 is discussed with reference to FIG. 1.

A hierarchical data object may be inserted into or deleted from column 130 such that index 180 may need automatic maintenance such as insertion, deletion, or modification of B+tree leaves. A consequence of using a search tree is that updating an indexed value in a hierarchical data object may cause the hierarchical data object's ROWID to move from one tree leaf to a different tree leaf, which may or may not further cause deletion or creation of a tree leaf. Additional complications are: a) multiple fields of the hierarchical data object may be updated by a same DML statement, and/or b) the hierarchical data object may have multiple index entries in index 180 such as for an array field. For example before receiving a SQL UPDATE statement, steps 701-702 respectively generate first and second index entries for a same hierarchical data object.

Executing the UPDATE statement may entail index maintenance as follows. Index maintenance may be complicated because the UPDATE statement may specify replacement of the whole hierarchical data object or a whole subtree in the hierarchical data object, even if only one or a few fields are actually changed. A straightforward embodiment may delete all of the hierarchical data object's index entries and then insert or reinsert index entries for the revised hierarchical data object, which may be suboptimal. For example, the straightforward embodiment may delete the hierarchical data object's ROWID from all B+ tree leaves and then add that ROWID to some leaves based on the revised hierarchical data object.

7.1 Index Maintenance Minimization

Various embodiments may more efficiently maintain index 180 based on detecting, in the following various ways, a subset of indexed fields of the hierarchical data object that actually changed. These ways entail respective strategies that apply in different respective scenarios. For example, two very different DML statements may change the value of a same field, and those two changes may be detected in different respective ways as follows.

The following different change detection mechanisms provide different respective balances between efficiency and flexibility. The more efficient is a change detection mechanism, the fewer scenarios are suitable for that mechanism. The least efficient change detection mechanism may be a general fallback mechanism that can accommodate any scenario.

7.2 Runtime Index Maintenance

In the general fallback mechanism, the original hierarchical data object and the revised hierarchical data object are more or less exhaustively compared and differenced to detect which indexed fields changed. In an embodiment, multiple sibling branches, subtrees, or tree paths in the original hierarchical data object are compared in parallel, such as with task parallelism on a multicore processor, to multiple respective branches in the revised hierarchical data object. In an embodiment, comparing original and revised document is based on a document object model (DOM) comparison even if hierarchical data objects are not stored in column 130 in a DOM format.

In a somewhat more efficient change detection mechanism, a redo log or undo log is scanned to detect which indexed fields changed. However, this mechanism is available only when logging is implemented and activated. Likewise, the log may need thread safety between writers and readers of the log that may decrease system throughput. For example, index 180 may have a log reader that performs index maintenance.

A SQL update statement may invoke JSON_TRANSFORM or JSON_MERGEPATCH to selectively add, remove, or modify portions of stored hierarchical data objects. An invocation of JSON_TRANSFORM or JSON_MERGEPATCH may specify activities such as addition or removal and specify locations such as nested fields and array offsets.

In various change detection mechanisms that are even more efficient, the above log interface or JSON_TRANSFORM or JSON_MERGEPATCH is instrumented to automatically report changed fields to index 180 for index maintenance. That is, the mechanism may be based on inversion of control such as with callbacks that DBMS 100 both invokes and handles. For example, a logging software layer may invoke the callbacks, and an indexing layer that maintains index 180 may handle the callbacks by performing index maintenance.

For example, callback instrumentation may accelerate index maintenance caused by the following example JSON_TRANSFORM.

```
json_transform(po_document,
   INSERT
      '$.ShippingInstructions.Phone[last+1]' =
         '909-555-1212')
```

For example for the above example JSON_TRANSFORM, a callback invocation may include arguments that indicate: a) the ROWID for po_document, b) the Phone array field, and c) insertion of a new phone number at the end of the array. JSON_TRANSFORM and JSON_MERGEPATCH are discussed later herein.

In the following index conditional maintenance scenarios that may occur in fulfillment of a callback invocation for the Phone array field, whether index entry(s) in index 180 need maintenance may depend on conditions such as: a) whether or not index 180 should index duplicate phone numbers that occur in the same array field of a same hierarchical data object, and b) whether or not the array field modification that caused the callback invocation also caused the array field to contain a different set of distinct values. For example when duplicates are not indexed, deletion of a duplicate value from an array should not modify the index because at least one other occurrence of the same value in the array survives.

In fulfilment of the callback invocation, the indexing layer may maintain index 180 in various ways. If the new phone number is not a duplicate of another element in the Phone array field, or if indexing of duplicates is intended, then a new index entry may be inserted into index 180 for the new phone number. If the new phone number is a duplicate and index 180 should not index duplicates within an array, then a new index entry is not inserted.

During a callback invocation for removal of a deleted phone number, similar conditional maintenance may or may not occur. For example if the deleted phone number is not a duplicate, or if indexing of duplicates is intended, an index entry may be deleted from index 180. If the deleted phone number is a duplicate and index 180 should not index duplicates within an array, then an index entry is not deleted.

During a callback invocation for modification of a phone number, in which an old phone number is replaced with a replacement phone number, similar conditional maintenance may or may not occur. For example if replacement of the old phone number with the replacement phone number changes the set of distinct values in the Phone array field, or if indexing of duplicates is intended, an index entry is replaced in index 180. If replacement of the old phone number with the replacement phone number does not change the set of distinct values in the Phone array field and index 180 should not index duplicates within the array, then index 180 does not need maintenance.

All of the change detection mechanisms discussed above occur at statement runtime, which may be during execution of an execution plan. Runtime change detection is flexible but with somewhat limited efficiency. For example, the flexibility of runtime change detection is well suited for distinguishing actual changes from nominal changes specified in a statement. For example, a statement may specify replacing the entirety of hierarchical data object 141 even though only the value of field 161 actually changes.

7.3 Compile-Time Index Maintenance

Runtime change detection mechanisms need not inspect the execution plan nor a statement parse tree such as an abstract syntax tree (AST) that contains statement semantic information. In limited cases that trade off some flexibility for increased efficiency, some or all change detection can be offloaded to statement compile time. Although runtime change detection mechanisms need not inspect the execution plan, a highly efficient change detection mechanism may be a compile-time change detection mechanism that does consult the parse tree or execution plan for an UPDATE statement to detect which indexed fields are changed as expressly specified in the statement.

For example, compile-time analytics may accelerate index maintenance caused by the above example JSON_TRANSFORM. For example, compile-time analysis may reveal: a) the ROWID for po_document, b) only the Phone array field is changing, c) a new phone number is being appended at the end of the Phone array field, and d) none of the existing elements of the Phone array field are modified, deleted, nor shifted.

7.4 Index Maintenance Avoidance

If indexed field 161 in hierarchical data object 141 is an array field that contains multiple temperature values, then hierarchical data object 141 may have multiple index entries in index 180. With any of the field change detection mechanisms discussed above, DBMS 100 can detect that changing the value array of field 161 from [0.3, 0.2] to [0.4, 0.2] means only the first ordinal position's value changed. That is one of various scenarios that cause step 703 to delete the first index entry without deleting the second index entry for the same hierarchical data object. Step 703 may instead be caused by changing the array value from [0.3, 0.2] to [0.3].

With any of the field change detection mechanisms discussed above, DBMS 100 can detect that a second UPDATE statement only changes field 162. By inspecting metadata of index 180, such as in a database dictionary, without actually accessing index 180, DBMS 100 detects that changed field 162 is not indexed by index 180. In that case, step 704 revises the hierarchical data object in column 130 without accessing nor maintaining index 180.

8.0 Practical Integration

Figure 8:
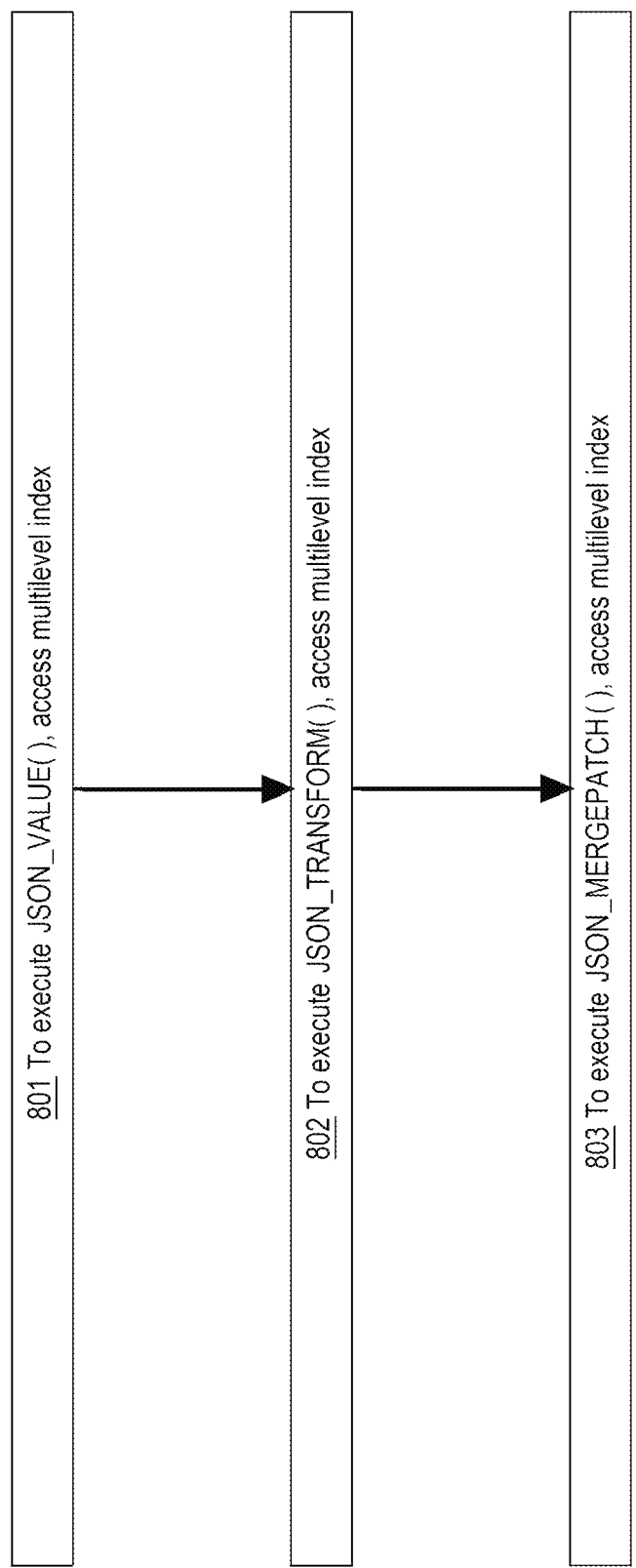
FIG. 8 is a flow diagram that depicts practical index integration.

FIG. 8 is a flow diagram that depicts practical usage of index 180 in an embodiment. FIG. 8 is discussed with reference to FIG. 1.

JSON_VALUE( ) is somewhat similar to JSON_EXISTS, except that JSON_VALUE extracts and returns actual field values from some or all hierarchical data objects in column 130. To execute JSON_VALUE( ), step 801 may access multilevel index 180. For example with either JSON_VALUE or JSON_EXISTS, if only indexed fields are accessed, then execution may be fulfilled by accessing only index 180 without needing to access column 130.

DML operations may be respectively categorized as create, read, update, or delete (CRUD). JSON_VALUE and JSON_EXIST only facilitate selection and filtration, whether reading or writing. Update and delete operations of CRUD are performed by JSON_TRANSFORM( ). JSON_TRANSFORM has complex syntax and semantics that are explained in related manual *Oracle Database JSON Developer's Guide,* 21c, part number F30948-01 that is incorporated in its entirety herein. To accelerate execution of JSON_TRANSFORM( ), step 802 may access multilevel index 180.

Although somewhat similar to JSON_TRANSFORM, JSON_MERGEPATCH( ) may be more complex due to recursive operation. For example, a same spelling error may be repeated in various ordinal positions in an array field and/or in various levels of a JSON document. JSON_MERGEPATCH may recursively match and fix all of those spelling errors and/or make other changes. JSON_MERGEPATCH has complex syntax and semantics that are explained in related manual *Oracle Database JSON Developer's Guide,* 21c. To accelerate execution of JSON_MERGEPATCH( ), step 803 accesses multilevel index 180.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
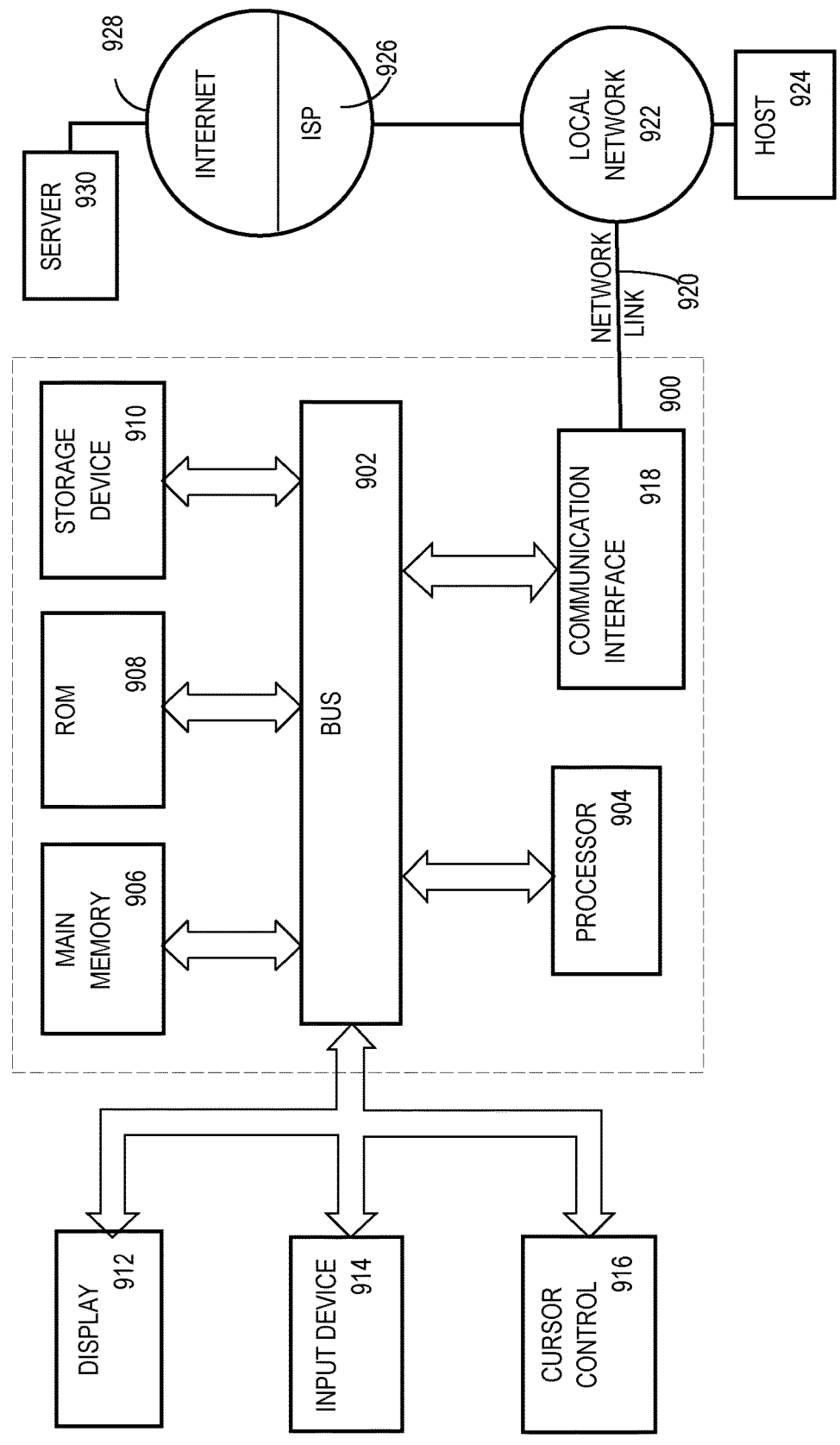
FIG. 9 is a block diagram that illustrates a computer system upon which an embodiment of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

Software Overview

Figure 10:
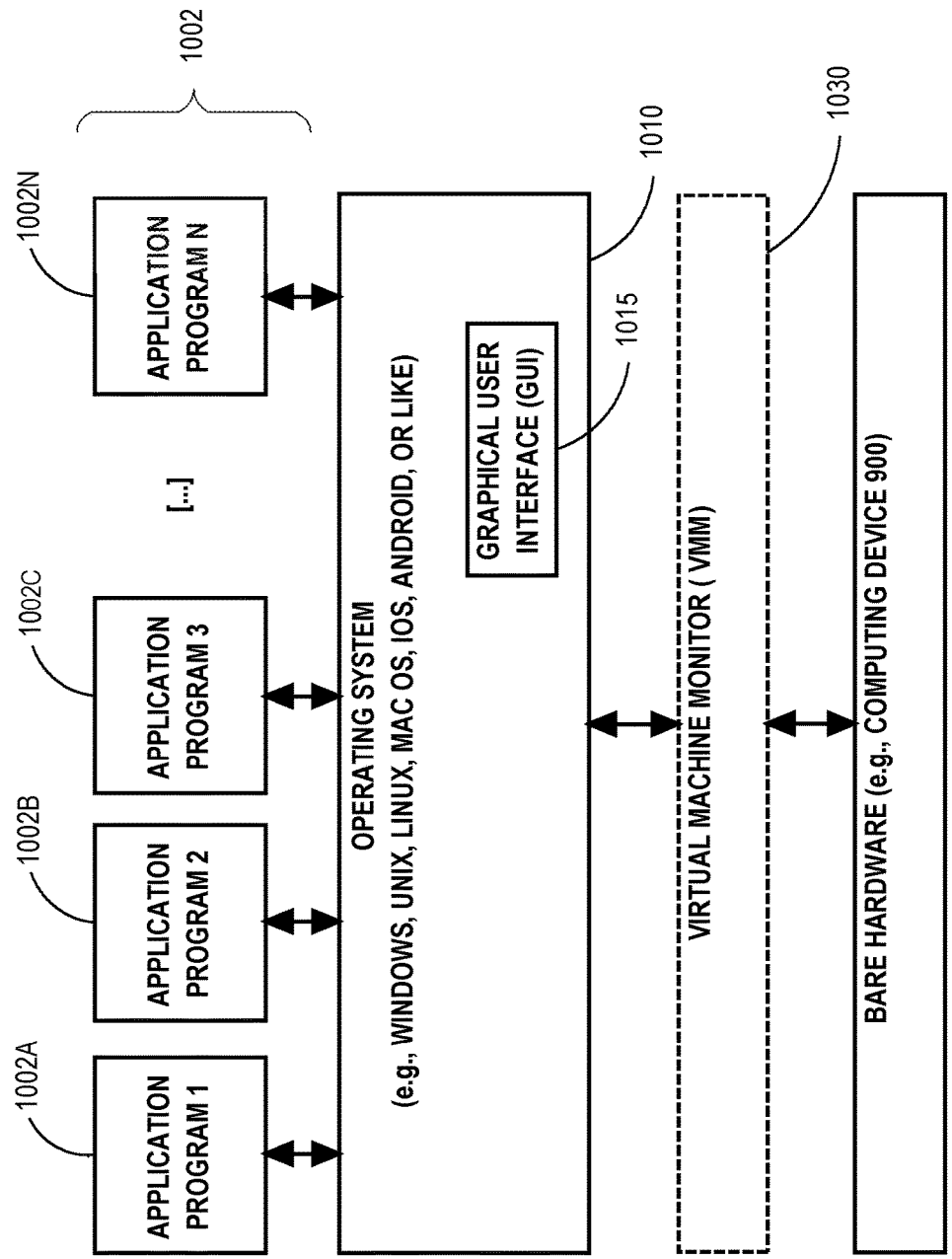
FIG. 10 is a block diagram that illustrates a basic software system that may be employed for controlling the operation of a computing system.

FIG. 10 is a block diagram of a basic software system 1000 that may be employed for controlling the operation of computing system 900. Software system 1000 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1000 is provided for directing the operation of computing system 900. Software system 1000, which may be stored in system memory (RAM) 906 and on fixed storage (e.g., hard disk or flash memory) 910, includes a kernel or operating system (OS) 1010.

The OS 1010 manages low-level aspects of computer operation, including managing execution of processes, memory allocation, file input and output (I/O), and device I/O. One or more application programs, represented as 1002A, 1002B, 1002C . . . 1002N, may be "loaded" (e.g., transferred from fixed storage 910 into memory 906) for execution by the system 1000. The applications or other software intended for use on computer system 900 may also be stored as a set of downloadable computer-executable instructions, for example, for downloading and installation from an Internet location (e.g., a Web server, an app store, or other online service).

Software system 1000 includes a graphical user interface (GUI) 1015, for receiving user commands and data in a graphical (e.g., "point-and-click" or "touch gesture") fashion. These inputs, in turn, may be acted upon by the system 1000 in accordance with instructions from operating system 1010 and/or application(s) 1002. The GUI 1015 also serves to display the results of operation from the OS 1010 and application(s) 1002, whereupon the user may supply additional inputs or terminate the session (e.g., log off).

OS 1010 can execute directly on the bare hardware 1020 (e.g., processor(s) 904) of computer system 900. Alternatively, a hypervisor or virtual machine monitor (VMM) 1030 may be interposed between the bare hardware 1020 and the OS 1010. In this configuration, VMM 1030 acts as a software "cushion" or virtualization layer between the OS 1010 and the bare hardware 1020 of the computer system 900.

VMM 1030 instantiates and runs one or more virtual machine instances ("guest machines"). Each guest machine comprises a "guest" operating system, such as OS 1010, and one or more applications, such as application(s) 1002, designed to execute on the guest operating system. The VMM 1030 presents the guest operating systems with a virtual operating platform and manages the execution of the guest operating systems.

In some instances, the VMM 1030 may allow a guest operating system to run as if it is running on the bare hardware 1020 of computer system 1000 directly. In these instances, the same version of the guest operating system configured to execute on the bare hardware 1020 directly may also execute on VMM 1030 without modification or reconfiguration. In other words, VMM 1030 may provide full hardware and CPU virtualization to a guest operating system in some instances.

In other instances, a guest operating system may be specially designed or configured to execute on VMM 1030 for efficiency. In these instances, the guest operating system is "aware" that it executes on a virtual machine monitor. In other words, VMM 1030 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

Database Dictionary

A database comprises data and a database dictionary that is stored on a persistent memory mechanism, such as a set of hard disks. A database is defined by its own separate database dictionary. A database dictionary may comprise multiple data structures that store database metadata. A database dictionary may for example, comprise multiple files and tables. Portions of the data structures may be cached in main memory of a database server.

A database dictionary comprises metadata that defines database objects contained in a database. In effect, a database dictionary defines much of a database. When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table. Metadata in the database dictionary defining a procedure may specify a name of the procedure, the procedure's arguments and the return datatype and the datatypes of the arguments, and may include source code and a compiled version thereof.

Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e., java file) and the compiled version of the class (i.e., class file).

Database Operation

A database dictionary is referred to by a DBMS to determine how to execute database commands submitted to a DBMS. Database commands can access the database objects that are defined by the dictionary. A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11 g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
storing, in a single column of a table in a relational database, a plurality of hierarchical data objects, wherein each hierarchical data object of the plurality of hierarchical data objects contains a respective plurality of levels, and each level of the plurality of levels of the hierarchical data object contains respective one or more fields;
generating an index for an indexed plurality of values in a plurality of fields in at least two levels of the pluralities of levels of the plurality of hierarchical data objects; and
executing, based on said index for said indexed plurality of values in said plurality of fields in said at least two levels, a database statement that references said table in the relational database and at least one field of said plurality of fields.

2. The method of claim 1 wherein a field in said plurality of fields in said at least two levels in a hierarchical data object of said plurality of hierarchical data objects contains a field plurality of values in said indexed plurality of values.

3. The method of claim 2 wherein:
said field plurality of values in said field in said hierarchical data object are ordered in a sequence of respective ordinal positions;
the method further comprises indicating said ordinal position of a value in said field plurality of values in said field in said hierarchical data object within said index for said indexed plurality of values in said plurality of fields in said at least two levels.

4. The method of claim 3 wherein said indicating said ordinal position of said value comprises said index indexing said ordinal position of said value in a same way as said generating said index for said indexed plurality of values in said plurality of fields in said at least two levels.

5. The method of claim 2 wherein:
said database statement contains a predicate that matches multiple distinct or non-distinct values in said field plurality of values in said field in said hierarchical data object;
said executing said database statement comprises generating a same result as if said predicate had matched only one value in said field plurality of values in said field in said hierarchical data object.

6. The method of claim 2 wherein:
said field plurality of values in said field in said hierarchical data object contains multiple distinct or non-distinct values;
said generating said index for said indexed plurality of values in said plurality of fields in said at least two levels comprises generating multiple index entries in said index for said field plurality of values in said field in said hierarchical data object.

7. The method of claim 2 wherein:
said field plurality of values in said field in said hierarchical data object contains duplicate values;
said generating said index for said indexed plurality of values in said plurality of fields in said at least two levels does not comprise generating multiple index entries in said index for same said hierarchical data object.

8. The method of claim 1 wherein said index for said indexed plurality of values in said plurality of fields in said at least two levels comprises a B+tree that contains a plurality of tree leaves that contain said indexed plurality of values in said plurality of fields in said at least two levels.

9. The method of claim 1 wherein said generating said index for said indexed plurality of values in said plurality of fields in said at least two levels is based on a data definition language (DDL) statement.

10. The method of claim 1 further comprising revising a hierarchical data object of said plurality of hierarchical data objects in said table without accessing said index for said indexed plurality of values in said plurality of fields in said at least two levels.

11. The method of claim 1 wherein:
said generating said index for said indexed plurality of values in said plurality of fields in said at least two levels comprises:
generating a first index entry in said index for a first value in said indexed plurality of values for a hierarchical data object of said plurality of hierarchical data objects, and
generating a second index entry in said index for a second value in said indexed plurality of values for same said hierarchical data object;
said executing said database statement comprises deleting said first index entry for said hierarchical data object without deleting said second index entry for same said hierarchical data object.

12. The method of claim 1 further comprising generating a second index for a second indexed plurality of values in a second plurality of fields in a second at least two levels of the plurality of levels of same said plurality of hierarchical data objects.

13. The method of claim 1 wherein said executing said database statement comprises accessing said index for said indexed plurality of values in said plurality of fields in said at least two levels based on an invocation in said database statement of at least one selected from the group consisting of: JSON_EXISTS, JSON_VALUE, JSON_TRANSFORM, and JSON_MERGEPATCH.

14. The method of claim 1 wherein said plurality of hierarchical data objects are a plurality of extensible markup language (XML) documents.

15. One or more non-transitory computer-readable media storing instructions that, when executed by one or more processors, cause:
- storing, in a single column of a table in a relational database, a plurality of hierarchical data objects, wherein each hierarchical data object of the plurality of hierarchical data objects contains a respective plurality of levels, and each level of the plurality of levels of the hierarchical data object contains respective one or more fields;
- generating an index for an indexed plurality of values in a plurality of fields in at least two levels of the pluralities of levels of the plurality of hierarchical data objects; and
- executing, based on said index for said indexed plurality of values in said plurality of fields in said at least two levels, a database statement that references said table in the relational database and at least one field of said plurality of fields.

16. The one or more non-transitory computer-readable media of claim 15 wherein a field in said plurality of fields in said at least two levels in a hierarchical data object of said plurality of hierarchical data objects contains a field plurality of values in said indexed plurality of values.

17. The one or more non-transitory computer-readable media of claim 15 wherein:
- said generating said index for said indexed plurality of values in said plurality of fields in said at least two levels comprises:
  - generating a first index entry in said index for a first value in said indexed plurality of values for a hierarchical data object of said plurality of hierarchical data objects, and
  - generating a second index entry in said index for a second value in said indexed plurality of values for same said hierarchical data object;
- said executing said database statement comprises deleting said first index entry for said hierarchical data object without deleting said second index entry for same said hierarchical data object.

18. The one or more non-transitory computer-readable media of claim 15 wherein said executing said database statement comprises accessing said index for said indexed plurality of values in said plurality of fields in said at least two levels based on an invocation in said database statement of at least one selected from the group consisting of: JSON_EXISTS, JSON_VALUE, JSON_TRANSFORM, and JSON_MERGEPATCH.

19. The one or more non-transitory computer-readable media of claim 15 wherein said plurality of hierarchical data objects are a plurality of extensible markup language (XML) documents.

* * * * *

UNITED STATES PATENT AND TRADEMARK OFFICE
CERTIFICATE OF CORRECTION

PATENT NO. : 11,640,380 B2
APPLICATION NO. : 17/198159
DATED : May 2, 2023
INVENTOR(S) : Zhang et al.

Page 1 of 1

It is certified that error appears in the above-identified patent and that said Letters Patent is hereby corrected as shown below:

On the Title Page

On page 2, Column 2, under Other Publications, Line 6, delete "Aglie" and insert -- Agile --, therefor.

On page 2, Column 2, under Other Publications, Line 16, delete "Orac!e@XML" and insert -- Oracle@XML --, therefor.

On page 2, Column 2, under Other Publications, Line 24, delete "Odle's" and insert -- Odie's --, therefor.

In the Specification

In Column 4, Line 13, delete "XMLTABLE( )" and insert -- XMLTABLE( ), --, therefor.

In Column 5, Line 53, delete "Hierchical" and insert -- Hierarchical --, therefor.

In Column 9, Line 67, delete "XML," and insert -- XML --, therefor.

In Column 10, Line 38, delete "typec" and insert -- type --, therefor.

In Column 10, Line 38, delete "loandat" and insert -- loandate --, therefor.

In Column 11, Line 63, delete "DML," and insert -- DML --, therefor.

In Column 11, Line 64, delete "contain" and insert -- contain '..' --, therefor.

In Column 16, Line 11, delete "JSON_EXIST" and insert -- JSON_EXISTS --, therefor.

Signed and Sealed this
Twenty-seventh Day of February, 2024

Katherine Kelly Vidal
*Director of the United States Patent and Trademark Office*